Patented Feb. 21, 1933

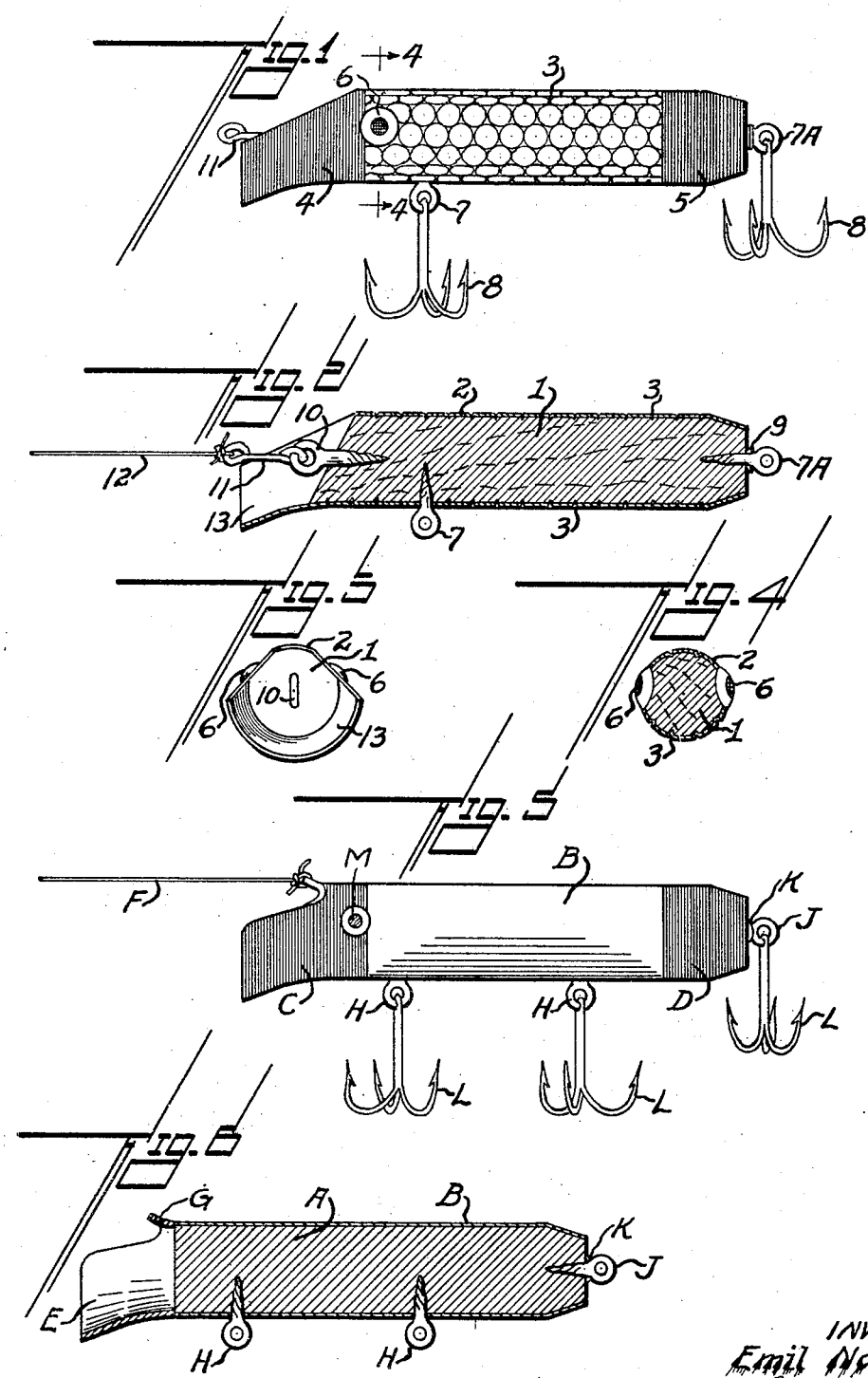

1,898,740

UNITED STATES PATENT OFFICE

EMIL NOVITZKY, OF DETROIT, MICHIGAN

FISH LURE

Application filed October 16, 1931. Serial No. 569,259.

My invention relates to fishing equipment in general but has particular reference to lures, and likewise provides an article of this character that due to the special design and construction thereof the device is decidedly more effective in catching fish, particularly of the desirable class.

One of the objects of my device is that its appearance resembles that of a fish and is constructed in a manner so that the various motions or circulation of the water will cause it to move through the water as if in the act of a small fish swimming, consequently it will quickly attract larger fish as a bait, whereas practically all of the lures upon the present market are as a rule motionless and are void of the activity of life.

The invention possesses further advantages, all of which will be clearly revealed during the course of the following detailed description, illustrated throughout the accompanying drawing, and more fully pointed out in the subjoined claim.

With reference to the drawing:

Figure 1 is an elevation of the complete device normally for use.

Figure 2 is a longitudinal section of the device taken through the center thereof, with all hooks omitted.

Figure 3 is a front elevation with line connecting link omitted.

Figure 4 is a transverse section taken substantially upon line 4—4 of Figure 1.

Figure 5 is an elevation of a modified form of the invention, and Figure 6 is a longitudinal section taken through the center of the same, with hooks omitted as indicated.

With reference to Figures 1 to 4 inclusive, it will be readily seen that core 1 is provided, and is covered with metallic shell 2, and a portion of the exterior surface of said shell is formed with continuous circles 3, as clearly indicated in Figure 1.

The purpose of circles 3 is to give the device the appearance of the scaly body of a fish. Portions 4 and 5 of the exterior surface are preferably colored red and glass eyes 6 are provided where shown. Screw eyes 7 and 7A are secured to bar 1 where indicated, and are adapted to retain hooks 8 respectively, also washer 9 for screw eye 7A. Larger screw eye 10 is also provided, to which is secured link 11 for connection with line 12.

While the device may be made of any material suitable for the purpose, it is preferred that the body or portion 1 thereof be made of wood and covered with sheet aluminum. In this manner the wood supports the aluminum adequately to make the device indestructible, while the combination of the brightness of the aluminum, the red ends and the eyes form an irresistible temptation as a fish bait.

The object for forming deflected semi-flange 13 is to cause the device to remain well under the surface of the water, and to further dip consistent with the speed it is drawn through the water.

With particular reference to Figures 5 and 6, the modified form of my invention illustrated therein, comprises wood body A, metal covering therefor as at B, and red colored ends C and D. Portion E is formed of heavier metal to properly support line F and has hole G where shown for this purpose. Screw eyes H and J are provided and are secured to body A where indicated, also washer K for screw eye J as shown. Said screw eyes are for supporting respective hooks L. The shell also has glass eyes M where indicated.

While I have herein described and later claimed one precise embodiment of my invention the same is nevertheless susceptible to certain changes or modification in the event that this condition prevails during any probable further development of the same for the market, however in any eventuality a departure from the general principle as described and illustrated by the accompanying drawing, would of course be consistently avoided.

Having thus described my invention, what I claim as new is:

A fish lure having an elongated body comprising a metallic tubular shell, one end of the said shell being conically formed to lessen water resistance, the opposite end of the said shell forming a mouth and the said mouth having a deflected semi-circular flange projecting outwardly therefrom, and this mouth portion of the device constituting means for a dip control for the same, which directs the device to penetrate the water at a given depth and to further dip in accordance to the speed the same is drawn through the water; a core within the aforesaid shell and solidly filling the same, the end of the said core adjacent the aforesaid mouth sloping from the top of the shell to a point near the inner portion of the aforesaid deflected semi-circular flange, and this formation being adapted to lessen water resistance as aforesaid.

In testimony whereof I hereunto affix my signature.

EMIL NOVITZKY.